US011270049B2

(12) United States Patent
He et al.

(10) Patent No.: US 11,270,049 B2
(45) Date of Patent: Mar. 8, 2022

(54) INTERNAL CHANNEL NETWORK DETECTIONS FOR 3D PRINTING

(71) Applicants: Siemens Industry Software Inc., Plano, TX (US); Xueqin He, Shanghai (CN); Sheng-Der Tang, Irvine, CA (US); Zhi Li, Cypress, CA (US); Chee-Keong Chong, Irvine, CA (US); Jingmei Wang, Pudong (CN); Yunfei Wu, Arcadia, CA (US); Lei Yang, Los Alamitos, CA (US)

(72) Inventors: Xueqin He, Shanghai (CN); Sheng-Der Tang, Irvine, CA (US); Zhi Li, Cypress, CA (US); Chee-Keong Chong, Irvine, CA (US); Jingmei Wang, Pudong (CN); Yunfei Wu, Arcadia, CA (US); Lei Yang, Los Alamitos, CA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/268,758

(22) PCT Filed: Sep. 12, 2018

(86) PCT No.: PCT/CN2018/105252
§ 371 (c)(1),
(2) Date: Feb. 16, 2021

(87) PCT Pub. No.: WO2020/051805
PCT Pub. Date: Mar. 19, 2020

(65) Prior Publication Data
US 2021/0248292 A1 Aug. 12, 2021

(51) Int. Cl.
*G06F 30/23* (2020.01)
*G06F 30/18* (2020.01)
(Continued)

(52) U.S. Cl.
CPC .............. *G06F 30/23* (2020.01); *G06F 30/18* (2020.01); *G06T 17/20* (2013.01); *G06F 30/00* (2020.01);
(Continued)

(58) Field of Classification Search
CPC ......... G06T 17/00; G06T 19/00; G06F 30/00; G06F 30/20; G05B 2219/49008
See application file for complete search history.

(56) References Cited

U.S. PATENT DOCUMENTS 4,128,353 A * 12/1978 Lauterbach ............. F16B 7/044
403/175
6,489,957 B1 * 12/2002 Han ........................ G06T 17/00
345/420
(Continued)

FOREIGN PATENT DOCUMENTS

| CN | 103817938 A | 5/2014 |
|----|-------------|--------|
| CN | 106780724 A | 5/2017 |

(Continued)

OTHER PUBLICATIONS

PCT International Search Report and Written Opinion of International Searching Authority dated Jun. 12, 2019 corresponding to PCT International Application No. PCT/CN2018/105252 filed Sep. 12, 2018.
(Continued)

*Primary Examiner* — Kibrom K Gebresilassie

(57) ABSTRACT

A computer-aided design (CAD) system may support detection of internal channel networks for 3D printing and may include a CAD model access engine and a channel network detection engine. The CAD model access engine may access a CAD model of a physical object to be constructed through 3D printing. The channel network detection engine may detect an internal channel network included in the CAD model of the physical object, including by identifying chan- (Continued)

nel openings along a surface of the CAD model that satisfy an opening size threshold and recursively identifying internal faces of the CAD model that form the internal channel network, wherein the internal faces are faces of the CAD model that are internal to the surface of the CAD model. The channel network detection engine may also perform a channel verification on the identified internal channel network to support the 3D printing of the physical object.

12 Claims, 6 Drawing Sheets

(51) Int. Cl.
*G06T 17/20* (2006.01)
*G06F 113/10* (2020.01)
*G06T 17/00* (2006.01)
*G06F 30/20* (2020.01)
*G06F 30/00* (2020.01)
*G06T 19/00* (2011.01)

(52) U.S. Cl.
CPC .......... *G06F 30/20* (2020.01); *G06F 2113/10* (2020.01); *G06T 17/00* (2013.01); *G06T 19/00* (2013.01)

(56) References Cited

U.S. PATENT DOCUMENTS

| | | | | |
|---|---|---|---|---|
| 10,216,172 | B2* | 2/2019 | Arisoy | G06F 30/00 |
| 10,345,791 | B2* | 7/2019 | Premakumar | G06T 19/20 |
| 10,706,623 | B1* | 7/2020 | Seibold | G06T 17/30 |
| 11,171,174 | B2* | 11/2021 | Bierret | H01L 27/14652 |
| 2011/0093106 | A1* | 4/2011 | Sinha | G06F 30/00 700/98 |
| 2014/0324211 | A1* | 10/2014 | Sullivan | G05B 19/4097 700/182 |
| 2015/0370926 | A1* | 12/2015 | Savage | G06F 30/00 703/1 |
| 2017/0015057 | A1* | 1/2017 | Stevens | B29C 64/386 |
| 2017/0061037 | A1 | 3/2017 | Makem et al. | |
| 2017/0355184 | A1* | 12/2017 | Le Maitre | B41F 19/007 |
| 2018/0086003 | A1* | 3/2018 | Greene | B33Y 10/00 |
| 2019/0065639 | A1* | 2/2019 | Allen | G06F 30/20 |
| 2019/0147649 | A1* | 5/2019 | Brochu | G06T 17/205 345/420 |

FOREIGN PATENT DOCUMENTS

| | | |
|---|---|---|
| CN | 107273558 A | 10/2017 |
| WO | 2017040006 A1 | 3/2017 |
| WO | 2018045351 | 3/2018 |

OTHER PUBLICATIONS

Haertel Jan H. K. et al., "A Fully Developed Flow Thermofluid Model for Topology Optimization of 3D-Printed Air-Cooled Heat Exchangers", Applied Thermal Engineering, Peramon, Oxford, GB, vol. 119, Mar. 10, 2017, XP029974878, 15 pages.

EP Search Report dated Sep. 24, 2021, for EP Application 18933037.6, 10 pages.

* cited by examiner

INTERNAL CHANNEL NETWORK DETECTIONS FOR 3D PRINTING

BACKGROUND

Computer systems can be used to create, use, and manage data for products and other items. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate design and simulated testing of product structures.

SUMMARY

Disclosed implementations include systems, methods, devices, and logic that support detection of internal channel networks for 3-dimensional (3D) printing.

In one example, a method may be performed, executed, or otherwise carried out by a CAD system or any other computing system. The method may include accessing a CAD model of a physical object to be constructed through 3D printing and detecting an internal channel network included in the CAD model of the physical object. Detecting may include identifying channel openings along a surface of the CAD model that satisfy an opening size threshold and recursively identifying internal faces of the CAD model that form the internal channel network, where the internal faces are faces of the CAD model that are internal to the surface of the CAD model. The method may also include performing a channel verification on the identified internal channel network to support the 3D printing of the physical object.

In another example, a system may include a CAD model access engine and a channel network detection engine. The CAD model access engine may be configured to access a CAD model of a physical object to be constructed through 3D printing. The channel network detection engine may be configured to detect an internal channel network included in the CAD model of the physical object, including by identifying channel openings along a surface of the CAD model that satisfy an opening size threshold and recursively identifying internal faces of the CAD model that form the internal channel network, wherein the internal faces are faces of the CAD model that are internal to the surface of the CAD model. The channel network detection engine may also be configured to perform a channel verification on the identified internal channel network to support the 3D printing of the physical object.

In yet another example, a non-transitory machine-readable medium may store instructions executable by a processor. Upon execution, the instructions may cause the processor or a CAD system to access a CAD model of a physical object to be constructed through 3D printing and detect an internal channel network included in the CAD model of the physical object, including by identifying channel openings along a surface of the CAD model that satisfy an opening size threshold and recursively identifying internal faces of the CAD model that form the internal channel network, wherein the internal faces are faces of the CAD model that are internal to the surface of the CAD model. Execution of the instructions may also cause the processor or CAD system to perform a channel verification on the identified internal channel network to support the 3D printing of the physical object.

BRIEF DESCRIPTION OF THE DRAWINGS

Certain examples are described in the following detailed description and in reference to the drawings.

DETAILED DESCRIPTION

Additive manufacturing (sometimes referred to as 3D printing) may be performed through use of 3D printers that can construct objects through material deposition. 3D printing typically involves material deposition on a layer by layer basis, which can be used to replicate or construct complicated object structures. Some modern industries utilize 3D printing to construct physical objects with complicated networks of internal channels. As examples, aerial components, aerospace structures, gas power turbines, or other machinery may include a complex network of internal cooling channels. Such internal cooling channels may be constructed via 3D printing, and in increasingly effective ways to propagate cooling fluid flow within a manufactured part to maintain a desired operational temperature.

Construction of internal cooling channels through 3D printing may give rise to certain issues. For example, residual micron-sized metal powders may linger in 3D constructed cooling channels under certain conditions, based on the length, diameter, size, or other geometric parameters of the internal channels. Manufacturability validations of internal channel networks for 3D printing may be performed via CAD tools through manual identification of internal channel components. However, such manual identification of the actual faces, topology, or components of complex internal channel networks can be time-consuming, error-prone, and inaccurate.

The disclosure herein may provide systems, methods, devices, and logic for detection of internal channel networks for 3D printing. In particular, the features described herein may provide for detections of internal channel network with increased efficiency and accuracy, improving computing performance in verification of channel networks for 3D printing. The automated channel network detection features described herein may improve performance and usability with respect to manual specifications. The features described herein may also support simplified user interface dialogs of CAD tools, as a user may select just a solid CAD model and specify various channel verification criteria to support such detections.

Figure 1:
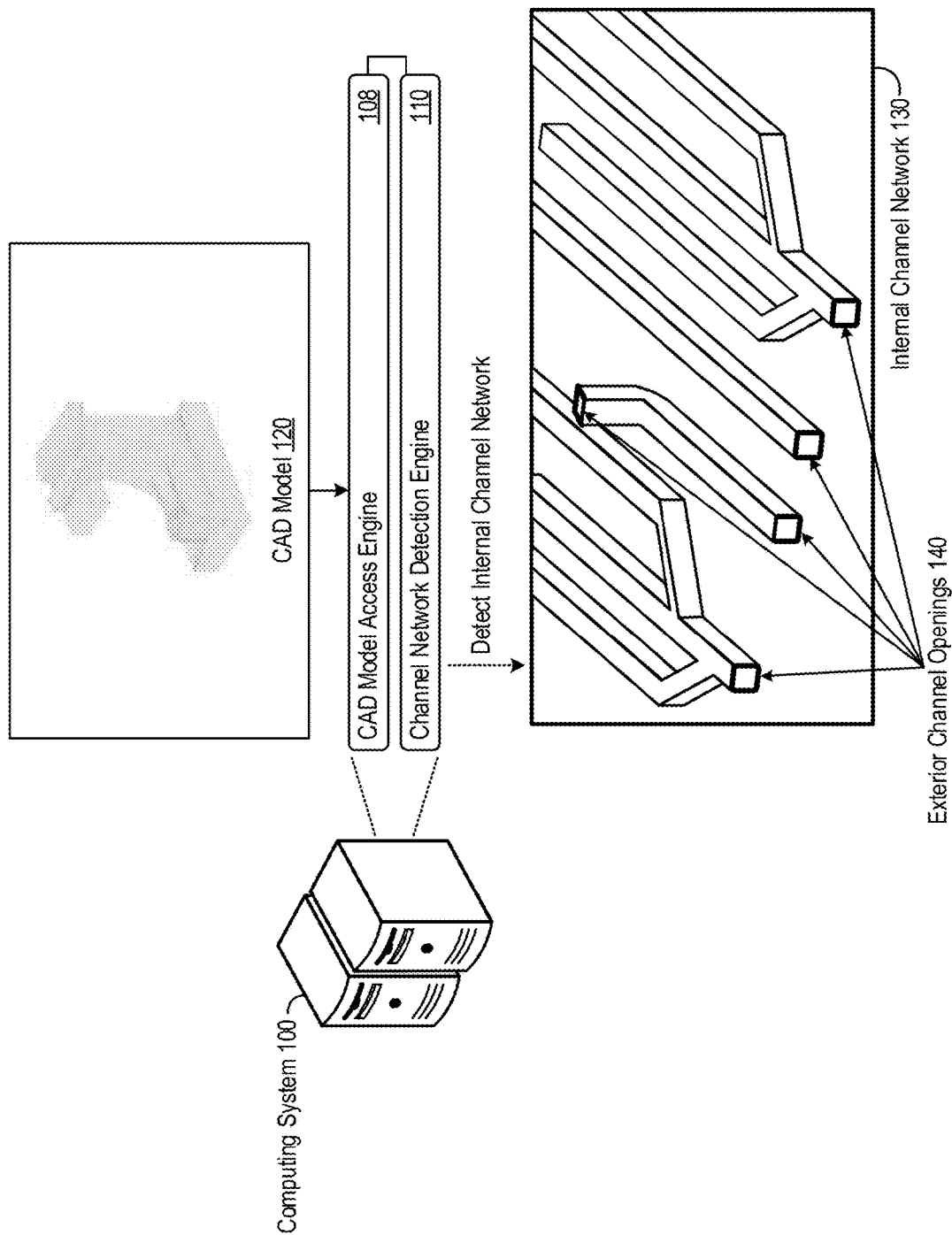
FIG. 1 shows an example of a computing system that supports detection of internal channel networks for 3D printing

FIG. 1 shows an example of a computing system 100 that supports detection of internal channel networks for 3D printing. The computing system 100 may include a single or multiple computing devices such as application servers, compute nodes, desktop or laptop computers, smart phones or other mobile devices, tablet devices, embedded controllers, and more. In some implementations, the computing system 100 implements a CAD tool or CAD program through which a user may design and simulate testing of product structures.

As described in greater detail herein, the computing system 100 may detect internal channel networks located within a physical object to be constructed via 3D printing. Such detection of internal channel networks may support further verifications to ensure viable construction of the physical object through 3D printing. In particular, the computing system 100 may identify exterior openings on the surface of a CAD model as channel openings and recursively detect internal CAD model components that form the internal channel network. The computing system 100 may flexibly detect internal channels for CAD models of various forms, e.g., by employing techniques for internal channel network detection via topological CAD model data, surface mesh data, or both.

As an example implementation, the computing system 100 shown in FIG. 1 includes a CAD model access engine 108 and a channel network detection engine 110. The system 100 may implement the engines 108 and 110 (and components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the system 100 implements multiple engines using the same computing system features or hardware components (e.g., a common processor or a common storage medium).

In operation, the CAD model access engine 108 may access a CAD model of a physical object to be constructed through 3D printing, such as the CAD model 120 shown in FIG. 1. In operation, the channel network detection engine 110 may detect an internal channel network included in the CAD model 120 of the physical object, for example an internal channel network 130 as shown in FIG. 1. The channel network detection engine 110 may do so by identifying channel openings along a surface of the CAD model 120 that satisfy an opening size threshold (such as the exterior channel openings 140 shown in FIG. 1) and recursively identifying internal faces of the CAD model 120 that form the internal channel network 130. The channel network detection engine 110 may also perform channel verifications on the identified internal channel network 130 to support the 3D printing of the physical object.

These and other example features of internal channel network detections according to the present disclosure are described in greater detail next.

Figure 2:
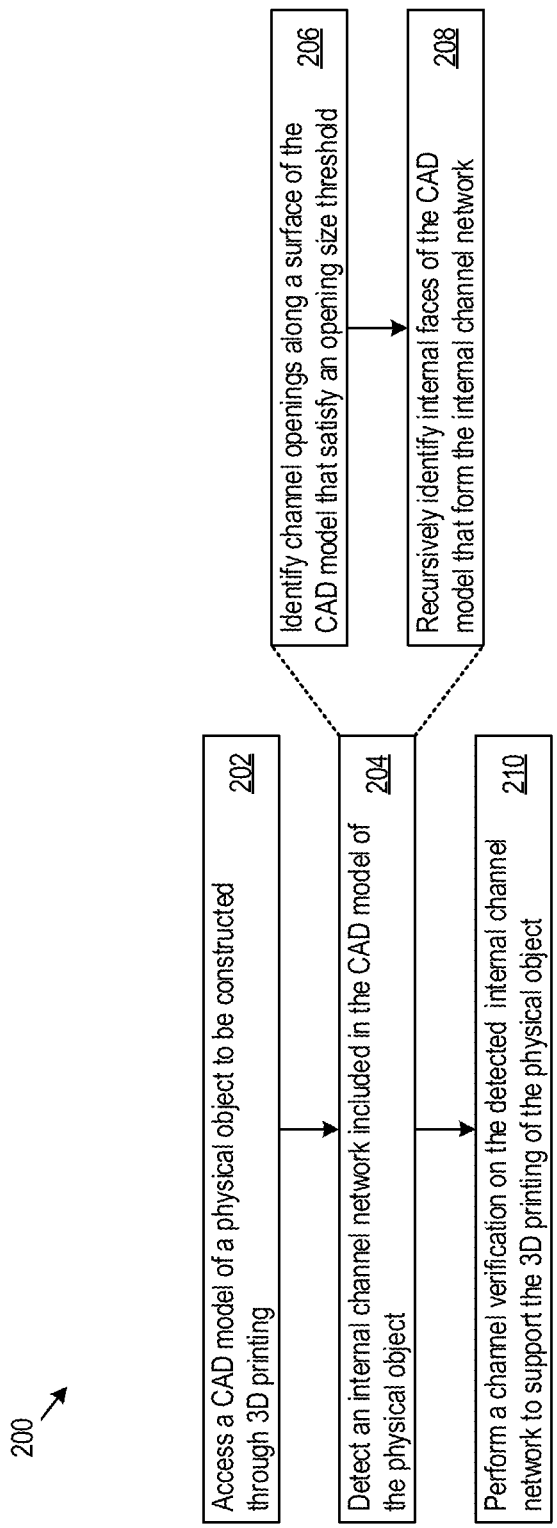
FIG. 2 shows an example of logic that a computing system may implement to support detection of internal channel networks for 3D printing.

FIG. 2 shows an example of logic 200 that a system may implement to support detections of internal channel networks for 3D printing. For example, the computing system 100 may implement the logic 200 as hardware, executable instructions stored on a machine-readable medium, or as a combination of both. The computing system 100 may implement the logic 200 via the CAD model access engine 108 and the channel network detection engine 110, through which the computing system 100 may perform or execute the logic 200 as a method to detect internal channel networks for 3D printing. The following description of the logic 200 is provided using the CAD model access engine 108 and the channel network detection engine 110 as examples. However, various other implementation options by the computing system 100 are possible.

In implementing the logic 200, the CAD model access engine 108 may access a CAD model of a physical object to be constructed through 3D printing (202). The CAD model access engine 108 may access various forms of CAD models, whether as native or neutral file formats. An accessed CAD model may include CAD topology data (for example, data on the solids, faces (e.g., polygons), vertices, and edges of a physical object). The CAD topology data may describe the topology/construction of the physical object represented by the CAD model. Additionally or alternatively, an accessed CAD model may include surface mesh data (for example, a collection of edges and vertices representative of a collection of mesh faces that represent the surface of the physical object). As used herein, a topological face may refer to a topology-based representation of a face element of CAD model. As used herein, a mesh face may refer to a particular mesh face in a surface mesh, such as a particular triangle or other mesh shape that a surface mesh is comprised of. As described in greater detail herein, the specific features of internal channel network detection may vary for topology-based internal channel network detections and mesh-based internal channel network detections.

Whether topological or mesh-based, the channel network detection engine 110 may detect an internal channel network included in the CAD model of the physical object (204). To do so, the channel network detection engine 110 may identify channel openings along a surface of the CAD model that satisfies an opening size threshold (206), which may also be referred to as exterior channel openings. Identified exterior channel openings may serve as end points of an internal channel network, and the channel network detection engine 110 may recognize identified channel openings as bounding conditions for recursive face identifications when detecting the internal channel network.

The opening size threshold may specify a threshold area, diameter, edge length, or other geometric parameter that an identified surface opening may be required to satisfy. As such, opening size thresholds may set an upper limit on the size (or other size-based characteristic) of a channel opening, which may allow the channel network detection engine 110 to filter other structural openings in a physical object from consideration during channel network detections. Doing so may increase the speed and efficiency of internal channel network detections, e.g., intelligently removing unnecessary computations for detection of channel networks. As an illustrative example, the opening size threshold may specify that the diameter of any exterior channel opening be less than 4 millimeters (or any other applicable value).

To identify channel openings along the surface of the CAD model, the channel network detection engine 110 may first analyze the CAD model to identify any openings that satisfy the opening size threshold. For CAD models that include topology data, the channel network detection engine 110 may identify any loops (a form of CAD topology data) located within a topological face of the CAD model. Such a loop may indicate an opening contained within an actual topological surface of the physical object, e.g., a hole in a surface wall. Thus, the channel network detection engine 110 may identify an opening along a surface of the CAD model as a topological loop included within a topological face of an exterior surface of a physical object.

As another example, the channel network detection engine 110 may identify an opening as a loop formed by the edges of multiple faces (whether topological or mesh faces). Such loops may not necessarily be identified as loop topological data for the CAD model, and the channel network detection engine 110 may specifically detect such multi-face loops as openings in the CAD model. To do so, the channel network detection engine 110 may analyze faces of the CAD model.

For multi-face loop detection, the channel network detection engine 110 may initially select a face with a convex edge (which may be a specific property of an edge, such that the faces connected by the edge are characterized by a convex shape/angle, e.g., less than 180 degrees). The convex edge, particularly along an exterior surface, may indicate that an adjacent face extends into the physical object, and thus potentially forms a channel opening. The channel network detection engine 110 may next determine whether another face adjacent to the initially-selected face also has a convex edge, continuing to do so until the initially-selected face is reached, upon which the channel network detection engine 110 may identify a multi-face loop. If the channel network detection engine 110 determines that no adjacent face includes a convex edge at any point before reaching the initially-selected face, then a multi-face loop is not identified by the channel network detection engine 110. Multi-face loop detection may then continue to other faces of the CAD model.

In such a way, the channel network detection engine 110 may identify loops present in the CAD model, whether a single-face loop located within a face (e.g., stored as topological data for the CAD model) or multi-faced loops formed by the convex edges of multiple faces. The identified loops, however, may include loops on the exterior surface of the CAD model (referred to as exterior loops or exterior openings) as well as loops located within surfaces inside of the physical object (referred to interior loops or interior openings). That is, exterior loops may lie on the peripheral or external surface of a physical object, whereas interior loops may be formed within surfaces located inside of the peripheral boundary of the physical object. For example, interior loops may include openings within an internal cooling channel at which the cooling channel splits into multiple branches.

The channel network detection engine 110 may differentiate between exterior loops and interior loops identified through CAD model analysis. As one way to do so, the channel network detection engine 110 may use ray tracing, e.g., firing rays from a face that the loop is located within or the multiple faces that form the multi-face loop. Through ray tracing, the channel network detection engine 110 may determine whether the applicable face(s) from which rays are fired intersect with other portions of the physical object (e.g., other faces, boundaries, components, mesh faces, etc.). If so, the loop formed by the applicable face(s) may be determined as an interior loop. If no intersection is detected for fired rays, the channel network detection engine 110 may determine the loop as an exterior loop (and, as such, a boundary condition for a recursive internal channel face identification process). Identified exterior loops that satisfy the opening size threshold may be referred to as exterior channel openings, e.g., as depicted in FIG. 1 through the exterior channel openings 140.

In any of the ways described herein, the channel network detection engine 110 may identify exterior channel openings, i.e., channel openings along a surface of the CAD model that satisfy an opening size threshold. In identifying channel openings along a surface of the CAD model, the channel network detection engine 110 may disregard whether such channel openings are channel inlets or outlets, as either will serve as a bounding condition for recursive face identifications to form the internal channel network.

Upon identifying the exterior channel openings, the channel network detection engine 110 may recursively identify internal faces of the CAD model that form the internal channel network (208). In a general sense, the channel network detection engine 110 may start at an identified exterior channel opening and identify an initial set of internal faces. Internal faces may refer to faces of the CAD model that are internal to the surface of the CAD model, e.g., channel faces inside the peripheral boundary of an object with exterior channel openings as channel inlets and outlets. From the initial set, the channel network detection engine 110 may identify a set of adjacent internal faces, and recursively continue to do so until a boundary condition is reached (e.g., identifying another set of internal faces that form another exterior channel opening or reaching a set of internal faces that have already been identified as part of the internal channel network, which may occur when a branch merges back into a previously identified channel). The channel network detection engine 110 may traverse each identified exterior opening loop in a similar manner until each set of adjacent channel faces reaches a boundary condition, thus ending the recursive process. The set of internal faces identified via this recursive process may comprise the faces of the CAD model that form the internal channel network.

During or after the recursive identification of internal channel faces, the channel network detection engine 110 may identify different branches in the internal channel network. A branch may refer to a sub-portion of a channel, by which the channel network detection engine 110 may delineate between channel forks, splits, or various distinct portions of a channel.

Accordingly, the channel network detection engine 110 may detect an internal channel network in a CAD model, including through identification of exterior channel openings and internal channel faces. The channel network detection engine 110 may be capable of employing varying techniques to recursively identify internal channel faces, including topology-based identifications and mesh-based identifications. Various features of these recursive identifications are described in greater detail with respect to FIGS. 3 and 4 below.

Continuing discussion of the logic 200 shown in FIG. 2, the channel network detection engine 110 may perform a channel verification on the detected internal channel network to support 3D printing of the physical object (210). The channel verification may apply any number of verification criteria to ensure manufacture viability of the internal channel network. Example verifications may include verifying that a channel (or branch) length-to-diameter ratio is within an acceptable range of values or that a channel radius at various angular channel orientations satisfies a minimum threshold. Some example verification features provided by the channel network detection engine 110 to support such channel verifications are described in greater detail with respect to FIG. 5 below.

The logic 200 shown in FIG. 2 provides an example by which a computing system 100 may support detections of internal channel networks for 3D printing. Additional or alternative steps in the logic 200 are contemplated herein, including according to any features described herein for the CAD model access engine 108, the channel network detection engine 110, or combinations of both. As such, the logic 200 may include any combination of the features described in FIGS. 3-5.

Figure 3:
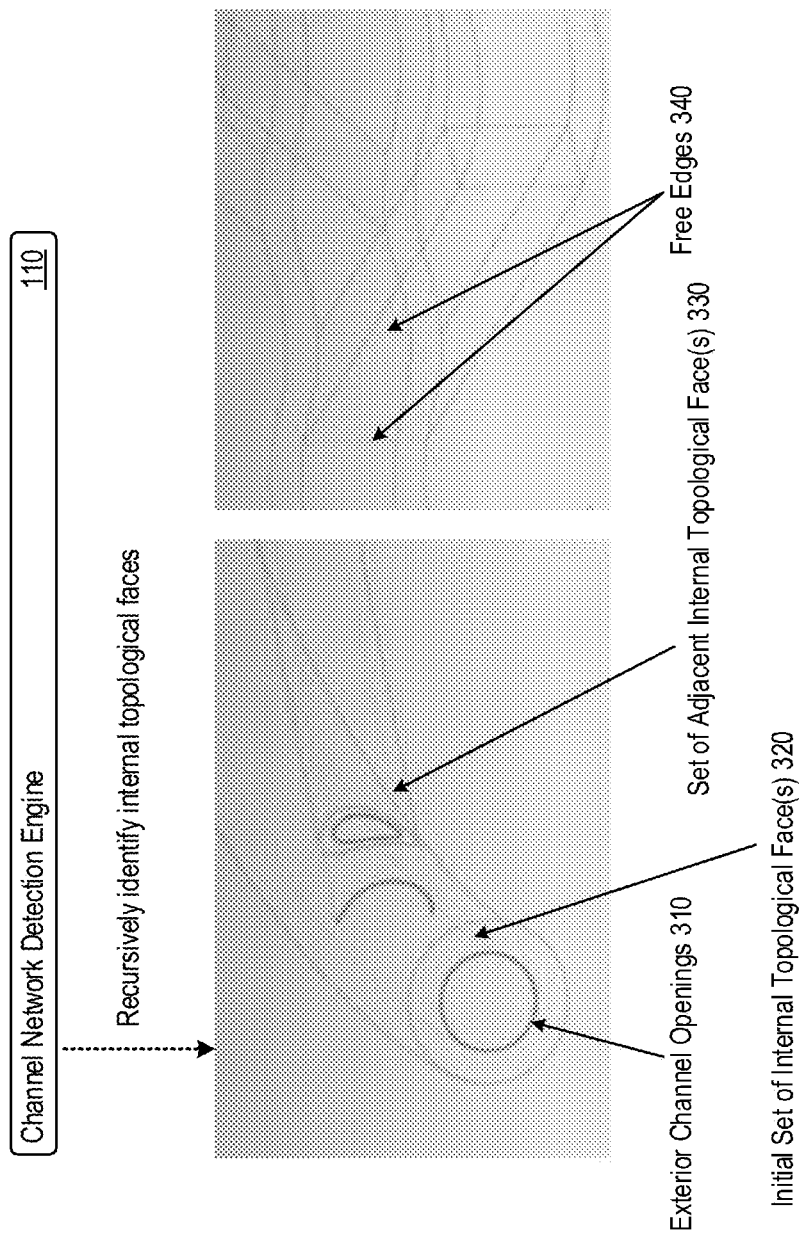
FIG. 3 shows an example of topology-based identifications of internal channel faces by a channel network detection engine.

FIG. 3 shows an example of topology-based identifications of internal channel faces by the channel network detection engine 110. Through topology-based identifications, the channel network detection engine 110 may identify the actual topology of an internal channel network, which may provide increased visibility as to the actual structure, components, and layout of detected internal channel networks. Through topology-based identifications, the channel network detection engine 110 may recursively identify internal topological faces that together form an internal channel network.

As noted above, the channel network detection engine 110 may start at an exterior channel opening, such as the exterior channel opening 310 shown in FIG. 3. From this exterior channel opening, the channel network detection engine 110 may identify an initial set of internal topological faces. The identified exterior channel opening may be formed by one or more convex edges with adjacent faces positioned inwardly from a peripheral surface of the CAD model (e.g., sink internally into the CAD model). These adjacent faces that first sink into the CAD model from the exterior loop may be identified by the channel network detection engine 110 as an initial set of internal topological faces.

In the example shown in FIG. 3, the channel network detection engine 110 may select the exterior channel opening 310 as a starting point in the recursive process and identify the initial set of internal topological faces 320 as shown. In this particular example, the channel network detection engine 110 may identify a single topological face as the initial set, as the exterior channel opening 310 is formed as a single-face loop. This identified single topological face may form a part of the channel in a cylindrical flow shape. The topology data of the exterior channel opening 310 and the cylindrical topological face in the initial set 320 may be stored as part of the topology data of the internal channel network. From this initial set 320, the channel network detection engine 110 may identify any topological faces adjacent to the single topological face in the initial set 320, for example the set of adjacent internal topological faces 330 shown in FIG. 3. In a recursive manner, the channel network detection engine 110 may continue identifying sets of adjacent internal topological faces until a boundary condition is reached, e.g., topological faces that form another exterior channel opening. Each identified set of adjacent internal topological faces may be tracked by the channel network detection engine 110 as topology data of the internal channel network.

During or after the recursive identification of internal topological faces that form a channel network, the channel network detection engine 110 may differentiate between various branches in the channel network. Each individual branch may be considered as a specific sub-segment of the internal channel network, which may be relevant for channel verifications (e.g., to determine an appropriate length or radius for manufacturability verifications).

To characterize particular topologies in a channel network as different branches, the channel network detection engine 110 may identify free edges in the topology. A free edge may refer to an edge in the channel network topology that is part of a particular topological face in a channel branch, but is not adjacent to any other topological faces of the channel branch. Example free edges 340 are depicted in FIG. 3. The channel network detection engine 110 may differentiate between branches in the internal channel network through identification of free edges that belong to internal topological faces of a particular branch, but are not adjacent to any other internal topological faces of the particular branch.

When identified free edges are determined to be convex edges and form a loop (at least in part), the channel network detection engine 110 may identify an interior channel opening. The interior channel opening may indicate the presence of a channel branch, and the channel network detection engine 110 may identify the topological faces connected to the identified free edges (not part of the particular branch from which these free edges were identified). The channel network detection engine 110 may, in effect, characterize these topological faces as the start of a new channel branch and track such topology data for the internal channel network accordingly.

In a consistent manner, the channel network detection engine 110 may continue to traverse through the topological faces of the internal channel network to identify free edges, interior channel openings, and channel branches. Through such a recursive traversal, the channel network detection engine 110 may track which internal topological faces of the internal channel network belong to which branches, which may be used for subsequent channel verifications.

In any of the ways described herein, the channel network detection engine 110 may perform topology-based recursive processes to identify internal topological faces that form an internal channel network as well as delineate different branches in the internal channel network.

Figure 4:
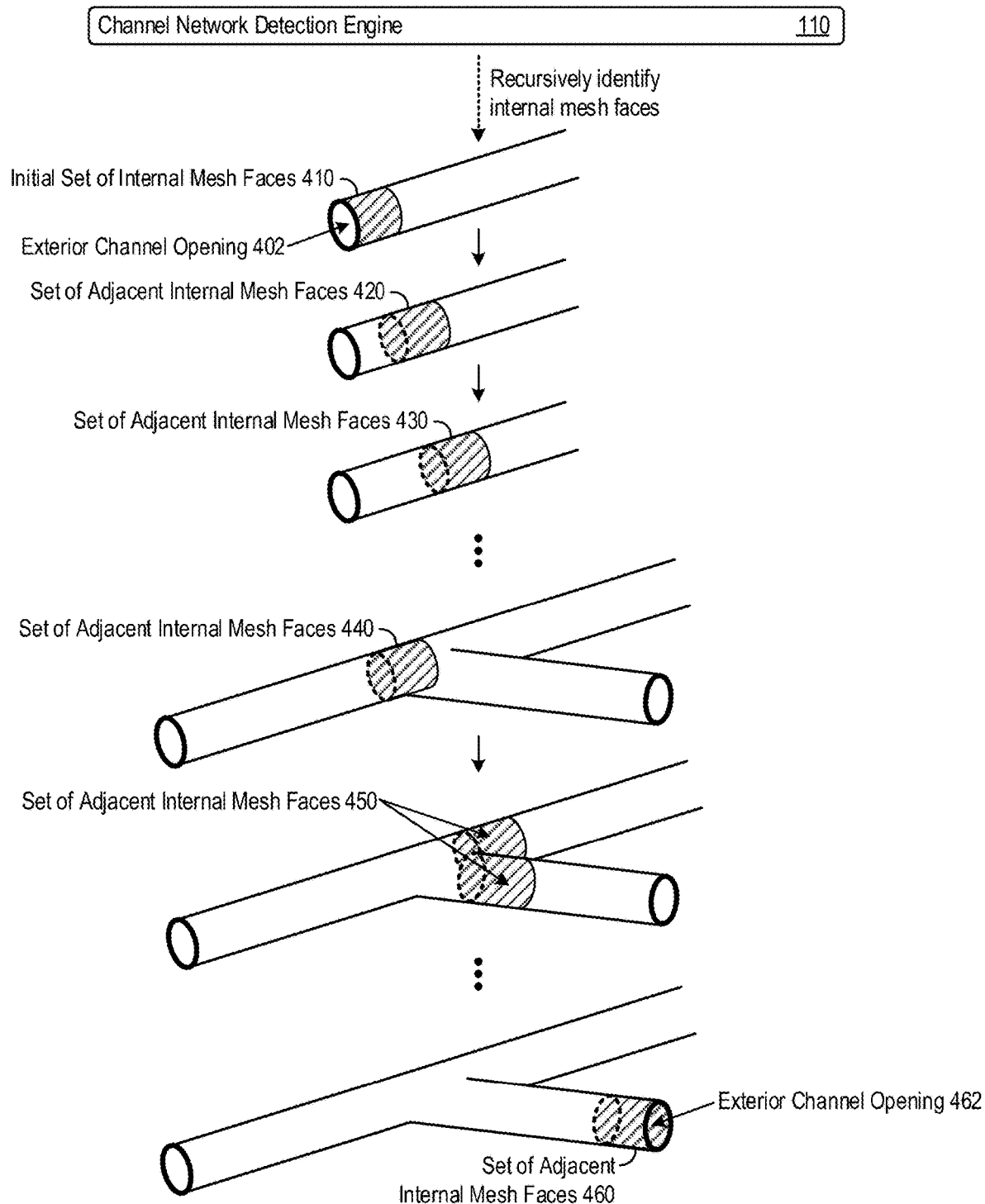
FIG. 4 shows an example of mesh-based identifications of internal channel faces by the channel network detection engine.

FIG. 4 shows an example of mesh-based identifications of internal channel faces by the channel network detection engine 110. Through mesh-based identifications, the channel network detection engine 110 may identify the surface structure of an internal channel network, which may provide an efficient mechanism to perform channel verifications without obtaining topology data or when such topology data is unavailable. Through mesh-based identifications, the channel network detection engine 110 may recursively identify internal mesh faces that together form an internal channel network.

To perform a mesh-based identification of internal channel faces, the CAD model access engine 108 may access a surface mesh of a physical object that is comprised of multiple mesh faces that form the CAD model. For instance, the CAD model access engine 108 may perform a meshing process on another CAD model format to obtain a surface mesh.

With the surface mesh, the channel network detection engine 110 may recursively identify the internal faces of the CAD model to form the internal channel network by identifying an initial set of internal mesh faces of the CAD model that form an identified channel opening along the surface of the CAD model. Then, the channel network detection engine 110 may recursively identify sets of adjacent internal mesh faces until another identified channel opening along the surface of the CAD model (exterior channel opening) is reached.

To illustrate through FIG. 4, the channel network detection engine 110 may start with the exterior channel opening 402 and identify an initial set of mesh faces that positioned in from a surface of the CAD model (e.g., based on the convexity of edges that form the exterior channel opening 402). In FIG. 4, the channel network detection engine 110 identifies a set of mesh faces that form the channel portion shown as the initial set of internal mesh faces 410 (mesh faces not illustrated on an individual basis for the sake of clarity).

In some implementations, the channel network detection engine 110 may characterize each determined set of internal mesh faces as a "layer" in the channel network, which may be a useful for manufacturability verifications to be performed on a layer-by-layer basis. Layer tracking may be accomplished via a hash map or any other suitable data structure that the channel network detection engine 110 may maintain. Layer tracking or any tracking of identified mesh face sets may also allow the channel network detection engine 110 to efficiently determine whether a subsequently identified mesh faces have already been identified as part of the channel network.

From the initial set of internal mesh faces 410, the channel network detection engine 110 may identify a set of adjacent internal mesh faces. To do so, the channel network detection engine 110 may identify any mesh face that shares a vertex or edge with a mesh face in the initial set of internal mesh faces 410. In the example shown in FIG. 4, the channel network detection engine 110 identifies the set of adjacent internal mesh faces 420. In a similar manner, the channel network detection engine 110 may track this layer of mesh faces and use this layer to identify a next set of adjacent internal mesh faces, shown as the set of adjacent internal mesh faces 430 in FIG. 4. Note that in identifying sets of adjacent internal mesh faces, the channel network detection engine 110 may filter any mesh faces that were previous identified, e.g. as tracked by a hash table or other data structure by which the channel network detection engine 110 may make such a determination.

The channel network detection engine 110 may identify different branches in an internal channel network during identification of sets of adjacent internal mesh faces. Such a process may be referred to as a branching detection, which may include forming a chain of mesh faces to determine whether branching has occurred. That is, for each identified set of adjacent internal mesh faces, the channel network detection engine 110 may determine whether the set of adjacent internal mesh faces link together to form just a single loop (e.g., a channel circumference) or not. To do so, the channel network detection engine 110 may select a particular mesh face in the set of adjacent internal mesh faces and sequentially link the next adjacent mesh face in the set until the particular mesh face is reached in this chain of mesh faces.

If every mesh face in the set of adjacent internal mesh faces is included in this chain, then only a single loop is formed by the set of adjacent internal mesh faces, and the channel network detection engine 110 may determine that no branching has occurred. Responsive to a determination that the chain of mesh faces does not include every mesh face in the set of adjacent internal mesh faces, the channel network detection engine 110 may determine that branching has occurred, and a new branch may include some of all of the mesh faces not included in the formed chain. In some instances, a set of adjacent internal mesh faces may include multiple branches (two, three, or more), each of which the channel network detection engine 110 may identify with a similar mesh face chaining process.

An illustrative example is shown in FIG. 4. In FIG. 4, the channel network detection engine 110 may identify the set of adjacent internal mesh faces 440 and next identify the set of adjacent internal mesh faces 450. When performing a branching detection for the set of adjacent internal mesh faces 450, the channel network detection engine 110 may determine that the set of adjacent internal mesh faces 450 includes at least two loops of mesh faces, e.g., as shown in FIG. 4. As such, the channel network detection engine 110 may identify multiple branches in the internal channel network responsive to such a determination.

In some implementations, the channel network detection engine 110 treats each identified chain of mesh faces (e.g., loop) in the set of adjacent internal mesh faces 450 as a distinct branch in the internal channel network, e.g., distinct to a branch that includes (and ends with) the set of adjacent internal mesh faces 440. That is, for each detected branching, the channel network detection engine 110 may close a previous branch and identify at least two additional branches in the internal channel network. In such a way, the channel network detection engine 110 may delineate between different branches in the internal channel network, which may support subsequent channel verifications.

In such a manner, the channel network detection engine 110 may recursively identify sets of mesh faces (e.g., layers) until a boundary condition is reached. An example of a boundary condition is shown in FIG. 4 through the set of adjacent internal mesh faces 460 and the exterior channel opening 462. In this example, the channel network detection engine 110 may identify the set of adjacent internal mesh faces 460 from a previously identified mesh face set. Responsive to a determination that the set of adjacent internal mesh faces 460 form, border, or otherwise include the exterior channel opening 462, the channel network detection engine 110 may determine that a boundary condition for the recursive mesh-based process has been reached. As such, the channel network detection engine 110 may determine not to determine a subsequent set of mesh faces adjacent to the set of adjacent internal mesh faces 460.

In any of the ways described herein, the channel network detection engine 110 may perform mesh-based recursive processes to identify internal mesh faces that form an internal channel network as well as delineate different branches in the internal channel network.

Figure 5:
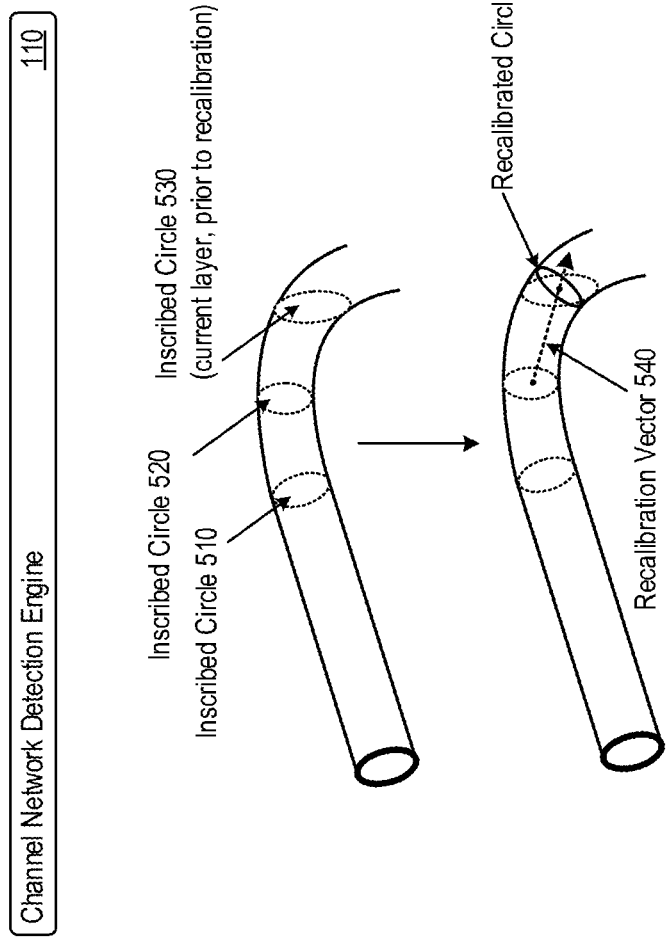
FIG. 5 shows an example of channel verifications that the channel network detection engine may support.

FIG. 5 shows an example of channel verifications that the channel network detection engine 110 may support. As noted previously herein, channel verifications may determine a manufacturability of a channel networks in a CAD model based on various parameters of the internal channel networks. One such parameter includes the diameter of cross-sections of the channel network at various points to ensure manufacture of internal channel network may, for example, be free from residual metal powders.

To support such channel verifications, the channel network detection engine 110 may determine various geometric parameters (e.g., a diameter) of various layers of mesh faces in the internal channel network. These channel verifications may be possible whether the internal channel network is determined via topology-based or mesh-faced recursive identification processes. For topology-based internal network channels, the channel network detection engine 110 may perform a meshing process to obtain a surface mesh for the internal channel network or an applicable sub-segment thereof (e.g., a current branch for which a channel verification is being performed).

The channel network detection engine 110 may perform channel verifications on a layer-by-layer basis. In other words, the channel network detection engine 110 may perform a channel verification for each set of adjacent internal mesh faces identified by the channel network detection engine 110. In some implementations, the channel network detection engine 110 does so by projecting a plane onto a particular set of adjacent internal mesh faces. Such a projection may include forming a complicated polygon in a 3D space by connecting the center (or other predetermined point) of each mesh face in the layer, and flattening the complicated polygon. As another way, the channel network detection engine 110 may project the centers of each mesh face in the layer onto a plane using least square method (or any other applicable technique).

The channel network detection engine may further determine an inscribed circle on the projected plane along the adjacent internal mesh faces of the particular set. In some examples, the channel network detection engine 110 determines a maximally inscribed circle along the polygon or centroid points on the projected plane, which may serve as an estimated cross-section for the layer (e.g., this particular set of adjacent internal mesh faces). Then, the channel network detection engine 110 may determine a channel diameter from the inscribed circle, the channel diameter used for a diameter-to-length verification for 3D printing of the physical object. Some example inscribed circles are shown in FIG. 5 as inscribed circles 510, 520, and 530.

In some implementations, the channel network detection engine 110 may recalibrate the projected plane to more accurately represent a cross-section of a channel branch. Various properties of an internal channel network may cause skewing in projected planes, and inscribed circles may skew based on how particular mesh faces represent a channel branch portion. For instances, curves of a channel branch may be represented by mesh faces of varying size, and the projected plane determined from mesh face centers of a particular layer may skew, with respect to an actual flow direction of the channel. An example of such skew is shown in FIG. 5 through the inscribed circle 530.

To address potential skew, the channel network detection engine 110 may recalibrate a projected plane upon which the inscribed circle is determined. For instance, the channel network detection engine 110 may recalibrate the projected plane using a center point of the inscribed circle 530 and a center point of a previously determined inscribed circle, such as the inscribed circle 520. The center of the inscribed circle 520 may, in effect, serve as a center point of for a previously determined set of adjacent internal mesh faces.

From these center points, the channel network detection engine 110 may project a recalibration vector 540, and the channel network detection engine 110 may recalibrate the projected plane of the inscribed circle 530 to be normal to the recalibration vector 540. Then, the channel network detection engine 110 may determine an recalibrated circle from the recalibrated plane, shown in FIG. 5 as the recalibrated circle 550. As such, the channel network detection engine 110 may determine a channel diameter applicable to a set of adjacent internal mesh faces from a recalibrated circle inscribed on the recalibrated projected plane along the adjacent internal mesh faces of the particular set. Although maximally inscribed and recalibrated circles are described herein, any other determined shape may be determined by the channel network detection engine 110 (e.g., oval, rectangles, complex polygons, etc.) to determine or approximate channel parameters for channel verifications.

By recalibrating the projected plane, the channel network detection engine 110 may reduce skew and increase the accuracy of channel verifications, which may increase the viability and effectiveness of 3D printing, particularly for physical objects with complex internal cooling channel networks.

In some implementations, the channel network detection engine 110 need not recalibrate a projected plane, and may address potential skew in other ways. For instance, in topology-based determinations of internal channel networks, the channel network detection engine may utilize the topology of identified channel sections (e.g., branches) to determine cross-sections with increased accuracy. To do so, the channel network detection engine 110 may identify edges along a channel branch or an iso-parametric curve along a single face that forms a branch, using identified edges as a guide curve geometry to construct a set of section planes. Each section plane may, in effect, represent a cross-section of the channel portion, and the channel network detection engine 110 may construct the cross-section planes at a sampling rate (e.g., as determined by an arc length of the edge/curve and a width tolerance parameter between planes, which may be configurable or user-specified).

As such, the channel network detection engine 110 may determine various sample points along the curve/edge, and each sample point may define an origin of a cross-section plane. The channel network detection engine 110 may construct a given cross-section plane to be normal to the edge or iso-parametric curve at the sample point (e.g., along a tangent vector). This constructed cross-section plane may intersect with mesh faces of the channel branch and form a polygon that represents a cross section of a channel branch. The channel network detection engine 110 may determine an inscribed circle from the polygon (e.g., a maximally inscribed circle), from which a channel diameter or other channel parameter can be obtained by the channel network detection engine 110. As each cross-section plane is constructed as normal (e.g., perpendicular) to the topological curve/edge of the branch (e.g., the flow pathway of the branch), recalibration of the cross-section plane need not be performed by the channel network detection engine 110.

Figure 6:
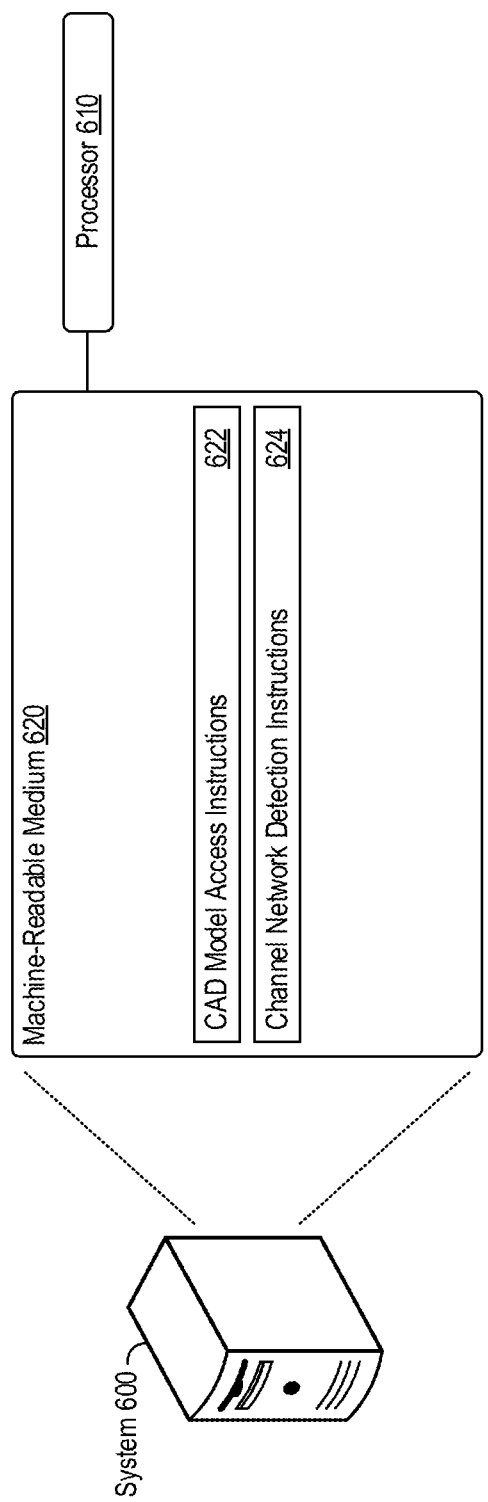
FIG. 6 shows an example of a system that supports detection of internal channel networks for 3D printing.

FIG. 6 shows an example of a system 600 that supports detection of internal channel networks for 3D printing. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the CAD model access instructions 622 and the channel network detection instructions 624 shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 600 may execute instructions stored on the machine-readable medium 620 through the processor 610. Executing the instructions may cause the system 600 (or any other computing or CAD system) to perform any of the channel network detection features described herein, including according to any of the features with respect to the CAD model access engine 108, the channel network detection engine 110, or a combination of both.

For example, execution of the CAD model access instructions 622 by the processor 610 may cause the system 600 to access a CAD model of a physical object to be constructed through 3D printing. Execution of the channel network detection instructions 624 by the processor 610 may cause the system 600 to detect an internal channel network included in the CAD model of the physical object, including by identifying channel openings along a surface of the CAD model that satisfy an opening size threshold and recursively identifying internal faces of the CAD model that form the internal channel network, wherein the internal faces are faces of the CAD model that are internal to the surface of the CAD model. Execution of the channel network detection instructions 624 may also cause the system 600 to perform a channel verification on the detected internal channel network to support the 3D printing of the physical object.

The systems, methods, devices, and logic described above, including the CAD model access engine 108 and the channel network detection engine 110, may be implemented in many different ways in many different combinations of hardware, logic, circuitry, and executable instructions stored on a machine-readable medium. For example, the CAD model access engine 108, the channel network detection engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the CAD model access engine 108, the channel network detection engine 110, or combinations thereof.

The processing capability of the systems, devices, and engines described herein, including the CAD model access engine 108 and the channel network detection engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
   by a computing system:
      accessing a computer-aided design (CAD) model of a physical object to be constructed through 3D printing;
      detecting an internal channel network included in the CAD model of the physical object, including by:
         identifying channel openings along a surface of the CAD model that satisfy an opening size threshold; and
         recursively identifying internal faces of the CAD model that form the internal channel network, wherein the internal faces are faces of the CAD model that are internal to the surface of the CAD model; and
      performing a channel verification on the detected internal channel network to support the 3D printing of the physical object, including by:
         projecting a plane onto a particular set of adjacent internal faces;
         determining an inscribed shape on the projected plane along the adjacent internal faces of the particular set; and
         determining a channel diameter from the inscribed shape, the channel diameter used for a diameter-to-length verification for 3D printing of the physical object, including by:
            recalibrating the projected plane using a center point of the inscribed shape and a center point of for a previously determined set of adjacent internal faces; and
            determining the channel diameter from a recalibrated shape inscribed on the recalibrated projected plane along the adjacent internal faces of the particular set.

2. The method of claim 1, wherein detecting the internal channel network further includes identifying different branches in the internal channel network.

3. The method of claim 1, wherein accessing the CAD model comprises accessing a surface mesh of the physical object that is comprised of multiple mesh faces that form the CAD model; and
   wherein recursively identifying the internal faces of the CAD model to form the internal channel network comprises:
      identifying an initial set of internal mesh faces of the CAD model that form an identified channel opening along the surface of the CAD model; and
      recursively identifying sets of adjacent internal mesh faces until another identified channel opening along the surface of the CAD model is reached.

4. The method of claim 3, wherein detecting the internal channel network included in the CAD model further comprises:
   determining a particular set of adjacent internal mesh faces includes at least two loops of mesh faces; and
   identifying multiple branches in the internal channel network responsive to such a determination.

5. The method of claim 1, wherein recursively identifying the internal faces of the CAD model to form the internal channel network comprises:
   identifying an initial set of internal topological faces of the CAD model that form an identified channel opening along the surface of the CAD model, the topological faces defined by a topology of the CAD model; and
   recursively identifying sets of adjacent internal topological faces until another identified channel opening along the surface of the CAD model is reached.

6. The method of claim 5, wherein identifying the internal channel network included in the CAD model further includes:
   differentiating between branches in the internal channel network through identification of free edges that belong to internal topological faces of a particular branch, but are not adjacent to any other internal topological faces of the particular branch.

7. A system comprising:
   a computer-aided design (CAD) model access engine configured to access a CAD model of a physical object to be constructed through 3D printing; and a channel network detection engine configured to: detect an internal channel network included in the CAD model of the physical object, including by:
   identifying channel openings along a surface of the CAD model that satisfy an opening size threshold; and
   recursively identifying internal faces of the CAD model that form the internal channel network, wherein the internal faces are faces of the CAD model that are internal to the surface of the CAD model; and perform a channel verification on the detected internal channel network to support the 3D printing of the physical object, including by:

projecting a plane onto a particular set of adjacent internal faces;

determining an inscribed shape on the projected plane along the adjacent internal faces of the particular set; and determining a channel diameter from the inscribed shape, the channel diameter used for a diameter-to-length verification for 3D printing of the physical object, including by:

recalibrating the projected plane using a center point of the inscribed shape and a center point of for a previously determined set of adjacent internal faces; and determining the channel diameter from a recalibrated shape inscribed on the recalibrated projected plane along the adjacent internal faces of the particular set.

8. The system of claim 7, wherein the CAD model access engine is configured to accessing a surface mesh of the physical object that is comprised of multiple mesh faces that form the CAD model; and wherein the channel network detection engine is configured to recursively identify the internal faces of the CAD model to form the internal channel network by:

identifying an initial set of internal mesh faces of the CAD model that form an identified channel opening along the surface of the CAD model; and recursively identifying sets of adjacent internal mesh faces until another identified channel opening along the surface of the CAD model is reached.

9. The system of claim 8, wherein the channel network detection engine is configured to detect the internal channel network included in the CAD model further by:

determining a particular set of adjacent internal mesh faces includes at least two loops of mesh faces; and identifying multiple branches in the internal channel network responsive to such a determination.

10. The system of claim 7, wherein the channel network detection engine is configured to recursively identify the internal faces of the CAD model to form the internal channel network by:

identifying an initial set of internal topological faces of the CAD model that form an identified channel opening along the surface of the CAD model, the topological faces defined by a topology of the CAD model; and recursively identifying sets of adjacent internal topological faces until another identified channel opening along the surface of the CAD model is reached.

11. A non-transitory machine-readable medium comprising instructions that, when executed by a processor, cause a system to:

access a computer-aided design (CAD) model of a physical object to be constructed through 3D printing, including by access a surface mesh of the physical object that is comprised of multiple mesh faces that form the CAD model;

detect an internal channel network included in the CAD model of the physical object, including by:

identifying channel openings along a surface of the CAD model that satisfy an opening size threshold; and recursively identifying internal faces of the CAD model that form the internal channel network, wherein the internal faces are faces of the CAD model that are internal to the surface of the CAD model, and including by:

identifying an initial set of internal mesh faces of the CAD model that form an identified channel opening along the surface of the CAD model; and recursively identifying sets of adjacent internal mesh faces until another identified channel opening along the surface of the CAD model is reached; and perform a channel verification on the detected internal channel network to support the 3D printing of the physical object by:

projecting a plane onto a particular set of adjacent internal mesh faces;

determining an inscribed shape on the projected plane along the adjacent internal mesh faces of the particular set; and determining a channel diameter from the inscribed shape, the channel diameter used for a diameter-to-length verification for 3D printing of the physical object, including by:

recalibrating the projected plane using a center point of the inscribed shape and a center point of for a previously determined set of adjacent internal faces; and determining the channel diameter from a recalibrated shape inscribed on the recalibrated projected plane along the adjacent internal faces of the particular set.

12. The non-transitory machine-readable medium of claim 11, wherein the instructions, when executed, cause the system:

Access a surface mesh of the physical object that is comprised of multiple mesh faces that form the CAD model; and recursively identify the internal faces of the CAD model to form the internal channel network by:

identifying an initial set of internal mesh faces of the CAD model that form an identified channel opening along the surface of the CAD model; and recursively identifying sets of adjacent internal mesh faces until another identified channel opening along the surface of the CAD model is reached.

\* \* \* \* \*